Sept. 27, 1960  B. GARRARD  2,954,111
RETURNED BOTTLE DETECTOR
Filed Dec. 30, 1955  7 Sheets-Sheet 1

INVENTOR.
Bruce Garrard
BY
Attorneys

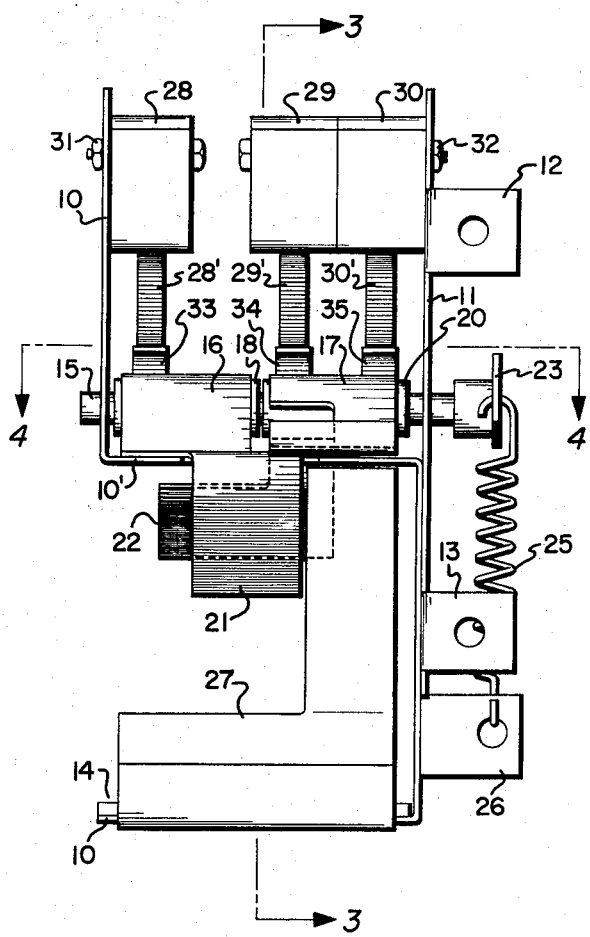

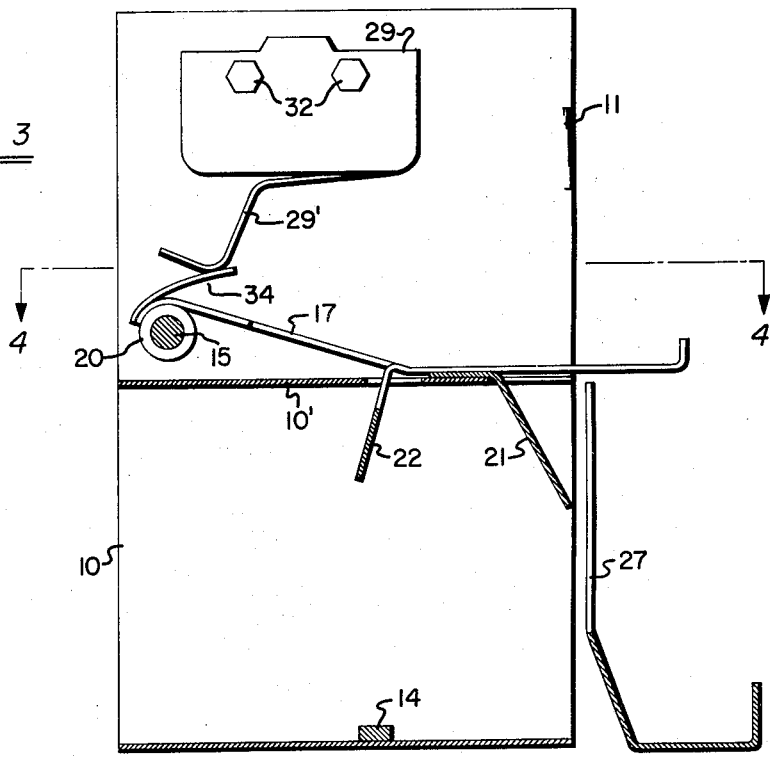
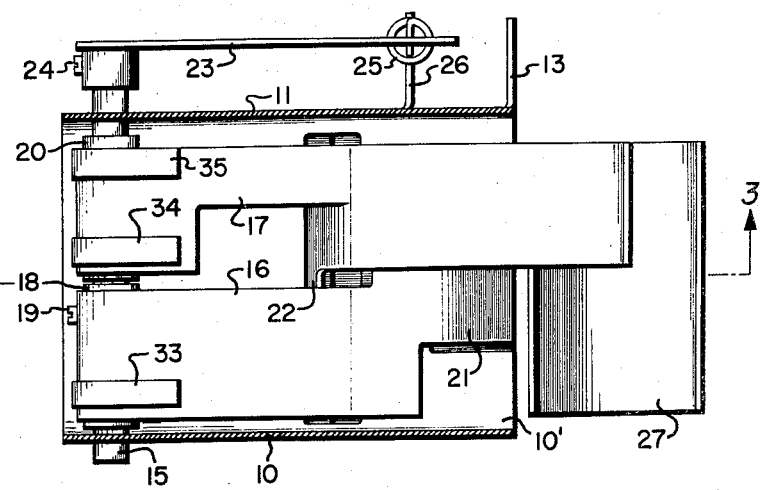

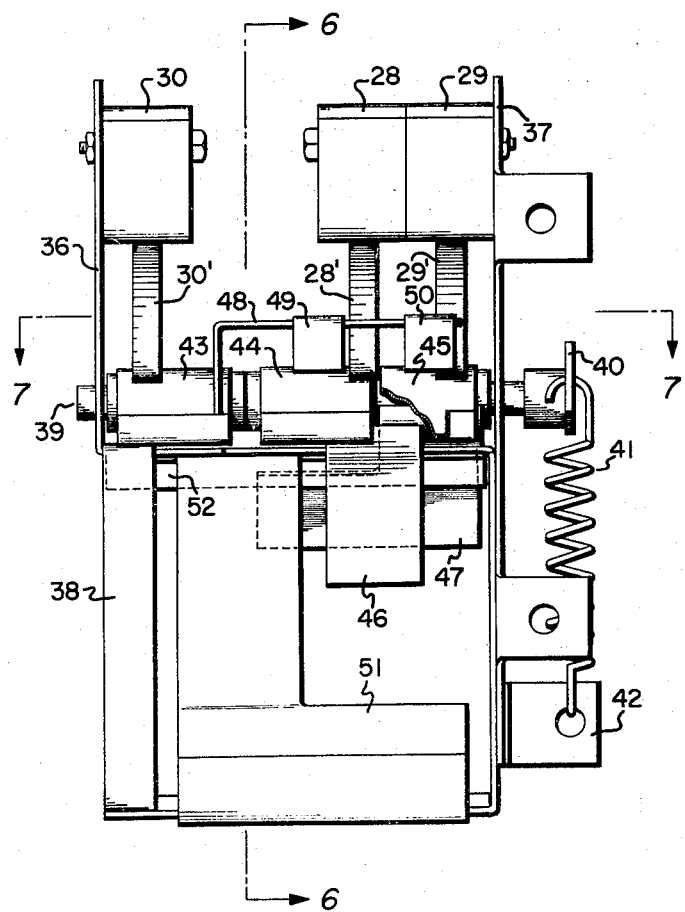

Sept. 27, 1960 B. GARRARD 2,954,111
RETURNED BOTTLE DETECTOR
Filed Dec. 30, 1955 7 Sheets-Sheet 5

INVENTOR.
Bruce Garrard
BY
Lippincott + Smith
Attorneys

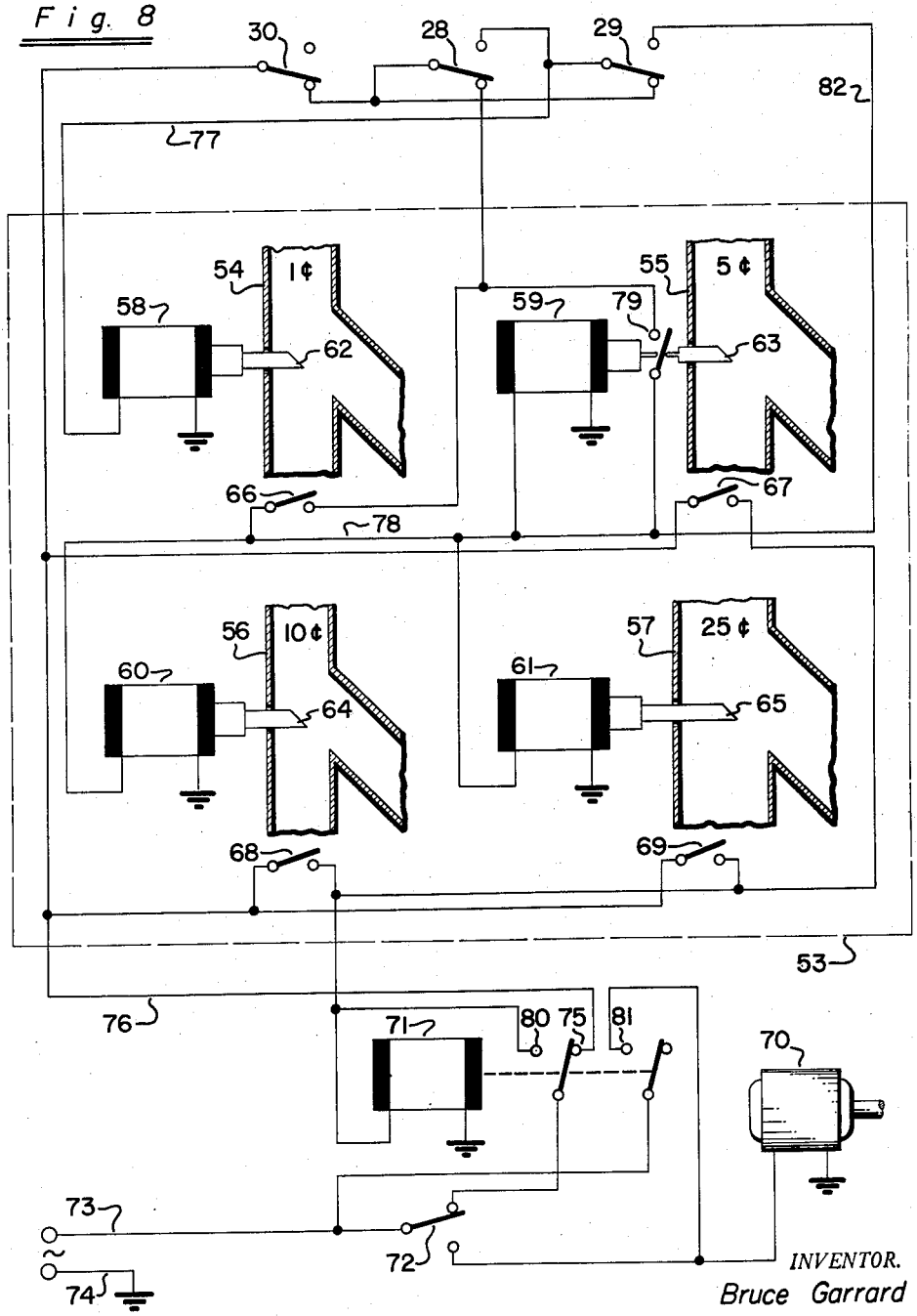

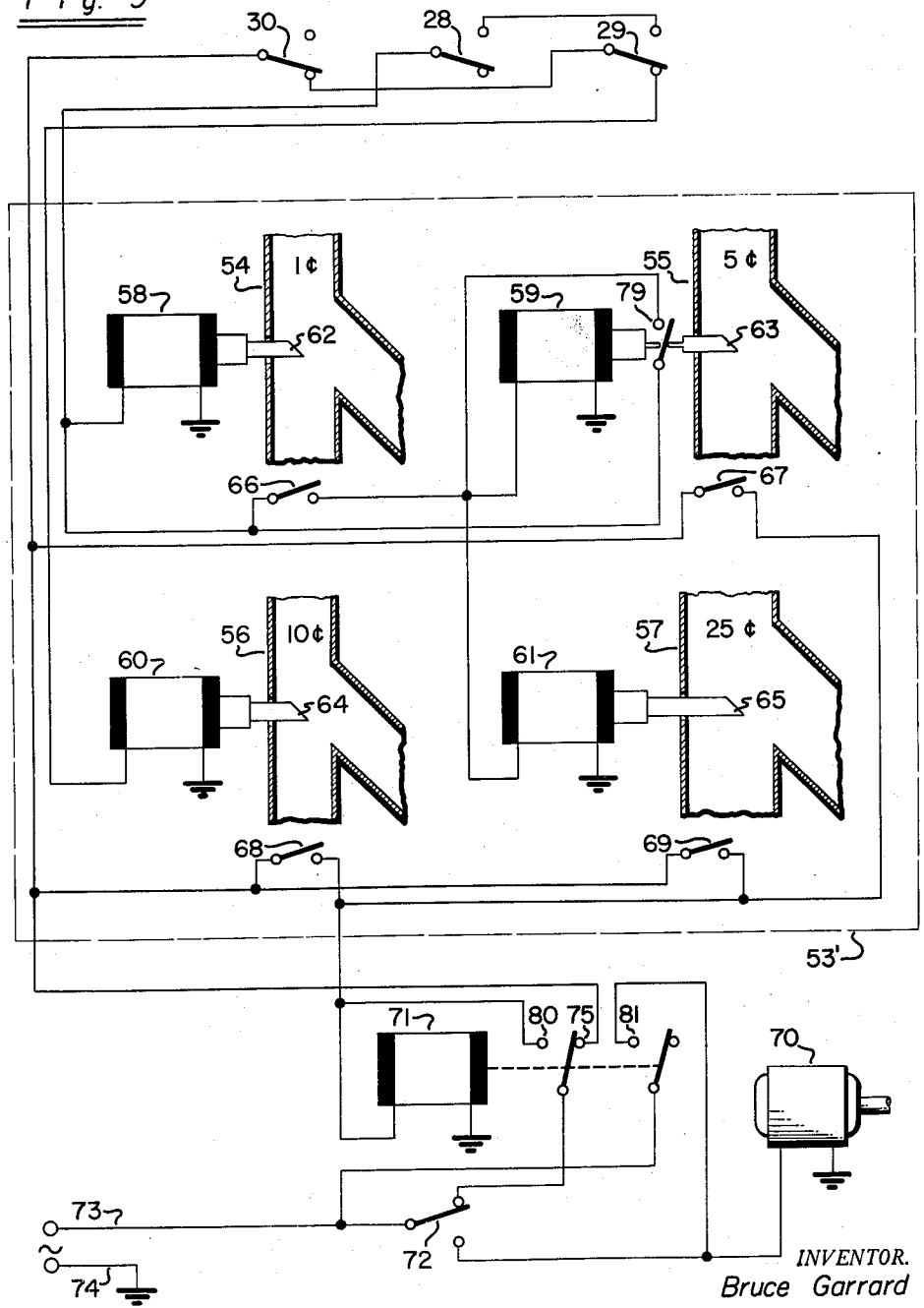

United States Patent Office 2,954,111
Patented Sept. 27, 1960

2,954,111

RETURNED BOTTLE DETECTOR

Bruce Garrard, 126 Montgomery Ferry Drive NE., Atlanta, Ga.

Filed Dec. 30, 1955, Ser. No. 556,537

15 Claims. (Cl. 194—4)

This invention relates to returned bottle receiving and detecting apparatus for vending machines that dispense bottled beverages and the like.

In coin operated vending machines for dispensing bottled beverages and receiving returned bottles, a returned bottle detector is required for automatically determining when a returned bottle has been received by the machine. The returned bottle detector should be capable of distinguishing bottles of the desired type from other bottles or objects that may be inserted fraudulently or inadvertently, and should be resistant to all kinds of fraudulent manipulations. Accordingly, an object of this invention is to provide an improved bottle detector that meets the above requirements.

A type of bottle vending machine that may advantageously be provided with bottle return provisions has a storage magazine with a spiral ramp on which bottles are stored with the neck portions extending inward and engaging a radially finned drum that is rotative for moving the stored bottles down the ramp. Returned bottles may be inserted in a bottle receiving space at or near the top end of the ramp, as is disclosed in my copending patent application, Serial No. 405,919, filed January 25, 1954, now Patent 2,804,958, issued September 3, 1957. In such a machine, the acceptance of returned bottles having broken neck portions is especially disadvantageous, since such broken bottles may jam the machine. Accordingly, another object of this invention is to provide a returned bottle detector that is especially effective in preventing the acceptance of broken bottles.

Other objects and advantages of the invention will appear as the description proceeds.

Briefly stated, in accordance with certain aspects of this invention, a returned bottle detector has a slanting member that is resiliently urged downward by a spring against the butt of a returned bottle with sufficient force to move the bottle inward until its neck portion abuts against the finned drum. A normal returned bottle, that is, an unbroken bottle of the desired type and size, holds the slanting member in an intermediate or partly-raised position, while bottles that are shorter than normal, and in particular bottles having broken neck portions, permit downward over-travel of the slanting member responsive to the urging of the spring. Such over-travel of the slanting member operates an electrical switch connected in a circuit that prevents the acceptance of defective bottles.

The invention will be better understood from the following description taken in connection with the accompanying drawings, and its scope will be pointed out in the appended claims. In the drawings, Fig. 1 is a fragmentary vertical section of a bottle vending machine with a returned bottle detector embodying principles of this invention, showing a returned bottle inserted in the detector;

Fig. 2 is an end view of the same bottle detector with- out the returned bottle, the plane of Fig. 2 being indicated generally by the line 2—2 of Fig. 1;

Fig. 3 is a vertical section taken generally along the line 3—3 of Fig. 2;

Fig. 4 is a horizontal section taken generally along the line 4—4 of Fig. 2;

Fig. 5 is an end view of an alternative returned bottle detector embodying principles of this invention, the plane of Fig. 5 being similar to the plane of Fig. 2;

Fig. 8 is a simplified electrical circuit diagram of the same vending machine; and Fig. 9 is a simplified alternative electrical circuit diagram.

Figure 1:
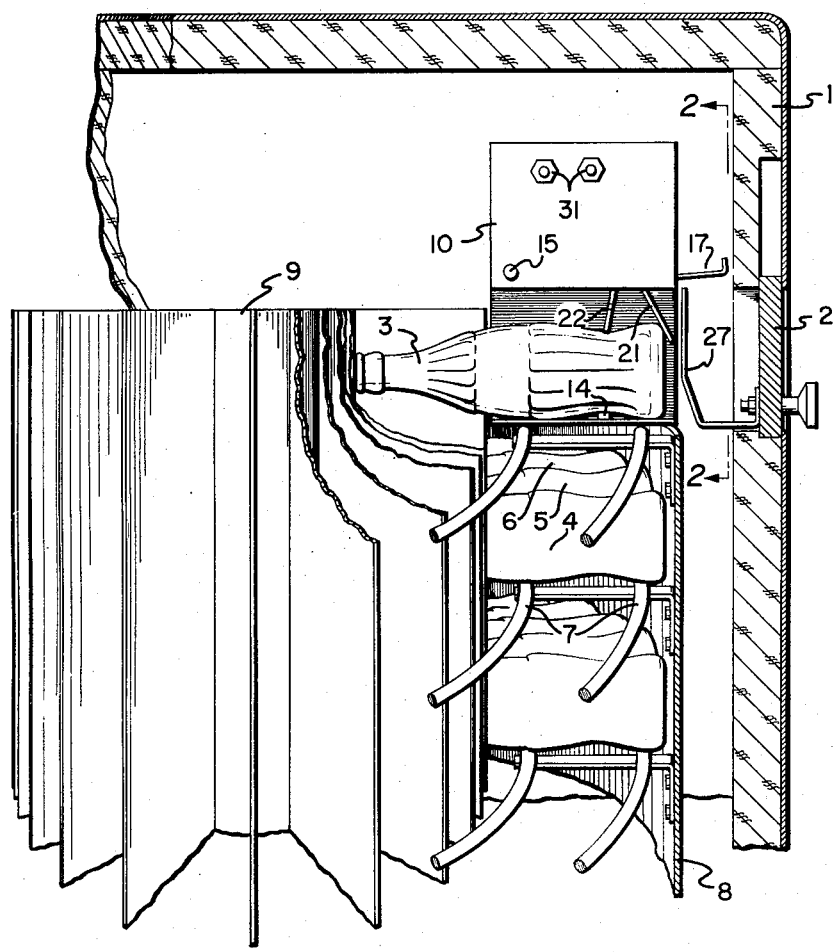

Referring now to Fig. 1 of the drawings, a bottle vending machine has a cabinet 1 with a vertically movable bottle return door 2 that may be opened for the insertion neck-first endwise, of a returned bottle 3 into a bottle receiving space of a returned bottle detector. Other bottles, some of which are illustrated at 4, 5 and 6, includes full bottles that are to be vended by the machine and empty bottles that have previously been returned to the machine. The bottles are stored in a magazine that includes a spiral ramp 7 extending around the inside of a cylindrical magazine housing 8. The bottles are supported by the ramp with their neck portions extending inward into engagement with a radially finned drum 9, as shown.

During each vending operation of the machine, a conventional vending mechanism rotates drum 9 by an amount equal to the angular distance between adjacent fins of the drum, and thereby moves each bottle in the magazine down the ramp a distance equal to one bottle storage space. The bottle at the bottom of the ramp is then delivered to the customer in a well-known manner. At the same time, the returned bottle is moved from the detector to the top of the ramp, thus clearing the bottle receiving space in the detector for the subsequent insertion of another returned bottle.

The returned bottle detector shown in Figs. 1 through 4 has a housing that preferably is made from a metal plate 10, bent to a shape best shown in Fig. 2, and a metal plate 11 welded or otherwise rigidly attached thereto. The bottom half of this housing defines a bottle receiving space into which returned bottles may be inserted when the door 2 is open. The left side of this bottle receiving space is open so that the bottle inserted therein can be removed by rotation of drum 9 when the vending mechanism operates. The top half of the detector housing supports and encloses a switching mechanism hereinafter described. The upper and lower halves of the detector housing are separated by a horizontal portion 10' of plate 10, which prevents access to the switching mechanism through door 2.

Plate 11 has a pair of mounting lugs 12 and 13 by means of which the bottle detector is attached to the framework of the vending machine. Across the bottom of the bottle receiving space there is a transverse bar 14 which aids in identifying bottles having a constricted waist, such as "Coca-Cola" bottles.

A horizontal rotative shaft 15 extends transversely through the upper portion of the bottle detector housing, as shown. Also within the upper portion of the detector housing, there are two substantially horizontal side-by-side levers 16 and 17, each pivoted for rotation about the axis of shaft 15. Lever 16 is welded to a collar 18 that is rigidly attached to shaft 15 by suitable means such as a set screw 19, while lever 17 is welded to a collar 20 that is freely rotative on shaft 15. Consequently, lever 16 is pivoted for rotation in unison with shaft 15, while lever 17 is pivoted for rotation independently of shaft 15.

A slanting depending part or cam 21 is bent down from or otherwise rigidly attached to lever 16, as shown, so that part 21 may extend downward over a cut-back edge of divider 10' into the bottle receiving space. A portion of part 21 underlies lever 17, so that upward movement of lever 16 also moves lever 17 upward. A depending part 22 is bent down from or otherwise rigidly attached to lever 17, so that part 22 may extend downward through a slot in divider 10' into the bottle receiving space. A portion of part 22 underlies a portion of lever 16 with sufficient clearance that lever 17 can be moved upward by a small amount without moving lever 16, while further upward movement of lever 17 also raises lever 16.

When a normal returned bottle 3, that is, an unbroken bottle of the desired size and shape, is inserted into the bottle receiving space of the detector and door 2 is closed, depending part 21 engages the butt of the returned bottle while depending part 22 engages the waist of the returned bottle, as is shown in Fig. 1. The engagement of these depending parts with a normal returned bottle supports levers 16 and 17 in partially raised or intermediate positions, in which lever 16 is held slightly above and out of contact with the horizontal portion 10' of plate 10, and lever 17 is held slightly above and out of contact with the portion of part 21 that underlies lever 17.

When there is no returned bottle in the bottle receiving space and door 2 is closed, both levers move downward beyond their intermediate positions until lever 16 contacts horizontal portion 10' of plate 10 and lever 17 contacts the portion of the part 21 that underlies lever 17. The levers are raised above their intermediate positions when door 2 is opened, by means hereinafter described.

A substantially horizontal arm 23 is rigidly attached to rotative shaft 15 by suitable means such as a set screw 24. A strong spring 25 is connected between the outer end of arm 23 and a stationary ear 26 bent out from or rigidly attached to plate 11. The tension of spring 25 tends to rotate shaft 15, in a clockwise direction as viewed in Fig. 3, and resiliently urges slanting part 21 against the butt of a returned bottle 3 with sufficient force to move the bottle 3 inward until its neck portion abuts against finned drum 9. A normal returned bottle limits the downward travel of part 21, and thereby holds lever 16 in its intermediate position. However, when a bottle that is shorter than normal or a bottle that has a broken neck portion is inserted into the bottle receiving space, lever 16 moves downward beyond its intermediate position responsive to the urging of spring 25.

A cam 27 is rigidly attached to door 2 and is moved upward when the door is opened. As cam 27 moves upward, a portion thereof engages lever 17 and raises this lever, thereby withdrawing depending part 22 from the bottle receiving space. As part 22 moves upward, it raises lever 16 and withdraws slanting part 21 from the bottle receiving space. A portion of cam 27 is cut out, as is best shown in Fig. 2, so that part 21 can freely move upward and backward as lever 16 rotates about the axis of shaft 15. Consequently, whenever door 2 is opened, both of the levers 16 and 17 are raised above their intermediate positions and both of these depending parts 21 and 22 are removed from the bottle receiving space, so that a returned bottle can be inserted easily and so that tampering with the detector mechanism is effectively prevented. When door 2 is closed, cam 27 moves downward and levers 16 and 17 are lowered until the depending parts 21 and 22 engage the inserted bottle, if any.

Three electrical switches 28, 29 and 30 are attached to plates 10 and 11 by suitable means such as mounting bolts 31 and 32. Switch operating arms 28', 29' and 30' depend from the switches and engage tabs 33, 34, and 35 that are welded or otherwise attached to levers 16 and 17, as shown. Switch 28 is operated by movement of lever 16 downward beyond the intermediate position in which it is held by a normal returned bottle, and switch 29 is operated by movement of lever 17 downward beyond its intermediate position. Switch 30 is operated by movement of lever 17 upward from its intermediate position. Since the part 21 attached to lever 16 underlies a portion of lever 17, movement of lever 16 upward from its intermediate position raises lever 17 and also operates switch 30.

In other words, each of the three switches 28, 29 and 30 is capable of actuation to either of two switch positions, selectively. When there is no bottle in the bottle-receiving space and door 2 is closed, levers 16 and 17 are in the lowermost positions and all three switches are in first or "normal" switch positions. When door 2 is opened, levers 16 and 17 are raised and all three switches are actuated to second or "actuated" switch positions. Now if a returned bottle is inserted and door 2 is closed, levers 16 and 17 move downward to their "intermediate" positions, and such downward movement of lever 17 to its intermediate position actuates switch 30 back to its first switch position while the other two switches remain in their second switch positions. If levers 16 and 17 move downward beyond their intermediate positions, in the absence of a returned bottle, for example, switches 28 and 29 are also actuated back to their first switch position.

Switches 28, 29, and 30 are connected in electrical circuits, hereinafter described, such that returned bottles are accepted and credited toward the purchase price of a full bottle only when both levers 16 and 17 are held in their partially-raised or intermediate positions by the returned bottle. The operating points of the three switches can easily be adjusted by bending tabs 33, 34, and 35, to insure that only normal returned bottles, unbroken and of the desired size and shape, will be accepted by the machine. When door 2 is opened and cam 27 raises lever 17, both of the switches 29 and 30 preferably operate before part 22 begins to raise lever 16. Consequently, as door 2 is opened, switch 30 always operates before switch 28. Conversely, when the door is closed without inserting a normal returned bottle, switch 28 operates before switch 30.

Figure 6:
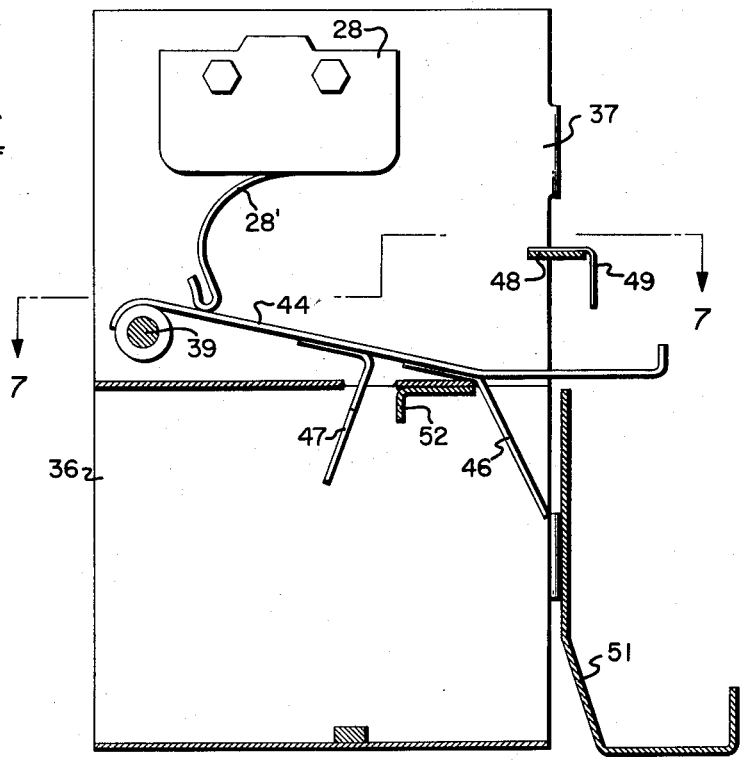
Fig. 6 is a vertical section taken generally along the line 6—6 of Fig. 5.
Figure 7:
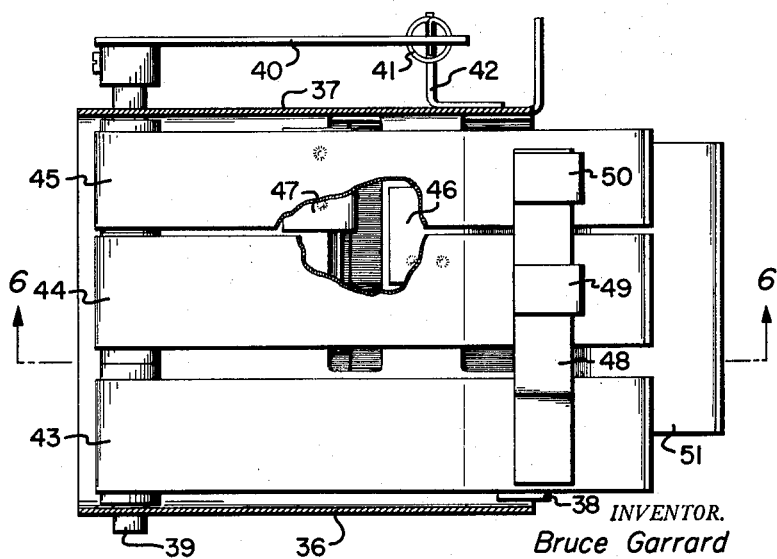
Fig. 7 is a horizontal section taken generally along the line 7—7 of Fig. 5.

The alternative bottle detector shown in Figs. 5, 6, and 7 is generally similar to the detector shown in Figs. 1 through 4, except for certain structural differences herein described. Referring now to Figs. 5, 6, and 7, the detector housing preferably is made from two plates 36 and 37 welded together and bent, as is best shown in Fig. 5, to form a bottle receiving space in the bottom half of the detector housing and an enclosure for the switching mechanism in the top half of the detector housing. A vertical strap 38 strengthens the lower part of the housing, but does not prevent removal of the returned bottle through the open left side of the bottle receiving space when the vending mechanism is operated.

A rotative shaft 39 extends transversely through the upper part of the detector housing, and has a substantially horizontal arm 40 rigidly attached thereto. A strong spring 41 is connected between the outer end of arm 40 and a stationary ear 42 so that the tension of spring 41 tends to rotate shaft 39 in a clockwise direction as viewed in Fig. 6.

Within the upper half of the housing there are three substantially horizontal side-by-side levers 43, 44, and 45, each pivoted for rotation about the axis of shaft 39. Lever 44 is rigidly attached to shaft 39, while levers 43 and 45 are pivoted for independent rotation on shaft 39. A slanting depending part 46 is rigidly welded or otherwise attached to lever 44 and underlies a portion of lever 45. A depending part 47 is rigidly welded or otherwise attached to lever 45 and underlies a portion of lever 44. A part 48, rigidly welded or otherwise attached to lever 43 and overlying portions of levers 44 and 45, has depending tabs 49 and 50 attached thereto as shown. Part 46 may extend downward into the bottle receiving space over a cut-back edge of the horizontal portion of plate 36 that divides the two halves of the detector housing and part 47 may extend into the bottle receiving space through a slot in the divider.

Electrical switches 28, 29, and 30 may be identical in structure and function to the correspondingly numbered switches of the detector shown in Figs. 2 through 4, except that in Figs. 5–7 the three switches are mounted in a different order within the detector housing and their switch arms 28', 29' and 30' may, if desired, be bent to slightly different shapes, as is shown in Fig. 6, so that the switch arms rest directly upon the levers and the adjusting tabs are not required. If so desired, adjusting tabs similar to those shown in Figs. 2 through 4 could be provided in the detector shown in Figs. 5 through 7, or the adjusting tabs could be omitted from the detector shown in Figs. 2 through 4. If the adjusting tabs are omitted, the operating point of the switches may be adjusted by bending the switch arms, but the tabs shown in Figs. 2–4 are preferred since they provide a more convenient means for adjustment of the switch operating points.

A cam 51, rigidly attached to the bottle return door 2, engages levers 43 and 44 and simultaneously raises these two levers when the door is opened. Since slanting part 46 is attached to lever 44 and underlies lever 45, lever 45 is raised at the same time as levers 43 and 44 when the door is opened, and both of the depending parts 46 and 47 are withdrawn from the bottle receiving space. A depending flange 52 may be attached to the horizontal dividing portion of plate 36 just in front of the slot through which part 47 extends, thereby masking this slot and providing additional assurance against any tampering with the detector switching mechanism.

When a normal returned bottle is inserted into the bottle receiving space defined by the lower half of the detector housing, the slanting depending part 46, which is resiliently urged downward by the tension of spring 41, engages the butt or outer end of the returned bottle and moves the bottle inward until its neck portion abuts against the finned drum. Depending part 47 engages the waist of the inserted bottle. Engagement of depending parts 46 and 47 with a normal returned bottle holds levers 44 and 45 in a partially raised or intermediate position. Downward movement of lever 44 beyond this intermediate position operates switch 28, while downward movement of lever 45 beyond its intermediate position operates switch 29. Upward movement of either of the levers 44 and 45 from their respective intermediate positions brings the lever so raised into contact with one of the depending tabs 49 and 50, and thereby raises part 48 and the lever 43 attached thereto. When lever 43 is raised, switch 30 is operated. When door 2 is opened, switch 30 always operates before switch 28. Conversely, as door 2 closes without insertion of a normal returned bottle, switch 28 operates before switch 30.

The improved returned bottle detectors may be used in a variety of vending machine circuits. Fig. 8 illustrates a preferred electrical circuit for a vending machine that will deliver a bottle of beverage at a sale price of 5 cents immediately after an empty bottle is returned to the machine, and will deliver a bottle of beverage at a higher sale price, 6 cents or 7 cents, for example, without the return of an empty bottle.

Referring now to Fig. 8, the broken-line box 53 represents a change-making coin mechanism, which may be of a conventional type except for the wiring modifications herein described. The coin mechanism has conventional slug rejecting and coin sorting apparatus, not shown, which receives and sorts coins inserted by the customer and delivers the pennies to a coin chute 54, the nickels to a coin chute 55, the dimes to a coin chute 56, and the quarters to a coin chute 57. The coin mechanism also contains conventional rejector solenoids 58, 59, 60 and 61, mechanically linked to respective ones of four rejector pins 62, 63, 64, and 65 associated with the four coin chutes, or equivalent coin rejecting apparatus. When the rejector solenoids are de-energized, the rejector pins deflect coins to one side into reject chutes, from which they are returned to the customer. Consequently, when all of the solenoids 58–61 are de-energized, no coins will be accepted by the coin mechanism.

When a rejector solenoid is energized by an electric current supplied thereto, it withdraws the associated rejector pin so that coins may pass directly through that coin chute. The passage of either one or two pennies directly through coin chute 54, the number depending upon the construction and adjustment of the coin mechanism, momentarily closes a coin switch 66. A nickel passing directly through the chute 55 momentarily closes a coin switch 67, a dime passing directly through chute 56 momentarily closes a coin switch 68, and a quarter passing through chute 67 momentarily closes a coin switch 69. Change-making mechanism, not shown, may be provided to return 5 or 20 cents in change when switch 68 or switch 69 is closed. Since such coin mechanism is well known to those skilled in the art, any further description thereof in this patent application would be superfluous.

A conventional vending mechanism of the machine includes a motor 70 that is operable to rotate drum 9, a relay 71 for initiating vending operations, and a switch 72 that is operated by the position of drum 9, generally by means of a switch arm that is engaged by the fins of the drum as the drum rotates. Switches 28, 29, and 30 are the electrical switches of a returned bottle detector of either type hereinbefore described or an equivalent detector. Electrical power is supplied through leads 73 and 74, which may be connected to any suitable electric outlet.

Assume that no empty bottle has been returned to the machine, and that door 2 is closed. All of the detector arms are in their lowest positions, and switches 28, 29 and 30 are in the switch positions shown in Fig. 8. It will be noted that there is a closed electrical circuit through the upper contact of switch 72 and a normally closed contact 75 of relay 71 that supplies electric power through lead 76 to the returned bottle detector. The closed circuit continues through the lower contact of switch 30 and the lower contact of switch 29 to lead 77, thereby supplying electric power to energize rejector solenoid 58. Solenoid 58 therefore withdraws pin 62 from the coin chute 54, so that any pennies inserted into the coin mechanism will be accepted. Rejector solenoids 59, 60 and 61 are de-energized, and consequently any nickels, dimes, or quarters inserted at this time will be rejected and returned to the customer.

After one or two pennies have been accepted, depending upon whether the coin mechanism is designed or adjusted for a six-cent sale or for a seven-cent sale, switch 66 is closed momentarily and this completes an electrical circuit from the closed lower contact of switch 28 to lead 78, thereby supplying electric power to energize coin rejector solenoids 59, 60, and 61. Solenoid 59 has a holding contact 79 connected in parallel with switch 66, so that after solenoid 59 is once energized, the circuit to solenoids 59, 60, and 61 remains closed despite subsequent reopening of switch 66. The coin mechanism will now accept a nickel, dime, or quarter, and as soon as any one of these coins is accepted, a corresponding one of the coin switches 67, 68 and 69 is closed momentarily, thereby completing an electrical circuit that energizes relay 71 of the vending mechanism. Then contact 75 opens, and all of the rejector solenoids are de-energized. The change-making mechanism, not shown, automatically returns the correct amount of change whenever a dime or a quarter is accepted. Once relay 71 has been energized, it is kept in the energized state by its holding contact 80.

When relay 71 is energized, it closes a contact 81 that supplies electric power to motor 70. Now motor 70 operates and begins to rotate drum 9. As drum 9 rotates, switch 72 drops to its lower switch position, thereby breaking the electrical circuit to relay 71. Consequently, relay 71 drops out, but motor 70 continues to operate since power is supplied to the motor by the lower contact of switch 72. After drum 9 has rotated through a distance equal to the angular spacing between adjacent ones of its fins, switch 72 is returned to its initial position, motor 70 stops, and the machine is ready for its next vending operation. It should be noted that electric power to the bottle detector and coin receiving mechanism was interrupted as soon as relay 71 picked up, and was not re-established until switch 72 returned to its initial position at the end of the vending cycle, so that no coins can be received by the machine while a vending operation is in progress.

Now assume that a normal returned bottle has been properly inserted through door 2 into the bottle receiving space of the detector mechanism and that door 2 has been closed. Switch 30 is closed, but switches 28 and 29 have been moved to their upper switch positions since the detector arms are held in their intermediate positions by engagement of the two depending parts of the detector with the inserted bottle. In this position of the detector switches, there is a closed electrical circuit through switch 30 and the upper contacts of switches 28 and 29 to lead 82, which supplies electrical power to energize rejector solenoids 59, 60, and 61. Consequently, when a normal returned bottle has been accepted by the machine, the coin apparatus will accept a nickel, dime, or quarter without the preliminary insertion of pennies. As soon as a nickel, dime, or a quarter has been accepted, a vending operation is initiated in the manner hereinbefore described, and in case a dime or a quarter is accepted, appropriate change is returned to the customer, so that a bottle of beverage is dispensed at a sale price of 5 cents immediately after a normal bottle has been returned to the machine.

Now assume that a bottle having a broken neck portion has been inserted through door 2 into the bottle receiving space of the bottle detector, and that door 2 has been closed. The slanting depending member of the bottle detector, being resiliently urged downward by a strong spring, moves the broken bottle inward past the fully-inserted position of a normal bottle, and consequently the detector lever attached to the slanting member moves downward beyond its intermediate position until switch 28 is in the lower switch position illustrated in Fig. 8. However, the other depending member keeps its detector lever in a partly raised position, so that switch 29 is in the upper one of its two positions.

From the circuit shown in Fig. 8, it is apparent that none of the coin rejector solenoids can be energized when the bottle detector switches are in the positions just described, and consequently no coins will be accepted by the coin mechanism so long as a broken bottle is within the bottle receiving space of the detector. To operate the machine again, it is necessary that the broken bottle be removed, which can easily be done by opening door 2. As a result, no broken bottles which might jam the machine will be accepted.

Whenever door 2 is open, switch 30 is also open and the coin mechanism will not accept coins. Consequently, the machine can never be operated with door 2 open. This, together with the fact that the depending bottle-engaging members of the detector are withdrawn from the bottle receiving space when the door is open, substantially eliminates fraud upon and tampering with the bottle detector. If an oversized bottle has been inserted, one or more of the detector levers will be held above its intermediate position for a normal returned bottle, and therefore switch 30 will be held open to prevent operation of the machine with an oversized bottle in the bottle receiving space. If an undersized bottle has been inserted, the vending machine either cannot be operated at all, as in the case of a broken bottle, or can be operated only upon payment of the increased price required without the return of a bottle, so that the insertion of undersized bottles is of no advantage to the customer.

It is important to note that the bottle detector is so arranged that the opening of door 2 always operates switch 30 before switch 28 is operated. If this were not the case, the machine might be defrauded simply by raising door 2 a sufficient distance to position switches 28 and 29 as they would be if a normal returned bottle had been inserted. In the detector constructions described, however, switch 30 is always operated before switch 28 when door 2 is partially opened, and such fraud upon the machine is therefore impossible.

Fig. 9 shows an electrical circuit for a vending machine that delivers a full bottle of beverage at a sale price of 10 cents without the return of an empty bottle, and at a sale price of 6 cents immediately after return of an empty bottle. The vending mechanism comprising motor 70, relay 71 and switch 72 is identical with that shown in Fig. 8. The coin mechanism 53' shown in Fig. 9 is identical to the coin mechanism 53 shown in Fig. 8, except for modifications of the electrical wiring, as shown, and except for the fact that no change is returned upon the acceptance of a dime. Twenty cents in change is returned upon the acceptance of a quarter.

When there is no returned bottle in the bottle receiving space of the detector, switches 28, 29, and 30 are in the switch positions shown in Fig. 9. Under these conditions, there is a closed electrical circuit through swtches 29 and 30 that energizes the dime rejector solenoid 60, so that a dime will be accepted by the coin mechanism to initiate a vending operation and to dispense a bottle of beverage at a sale price of 10 cents without the return of an empty bottle. Rejector solenoids 58, 59, and 61 are de-energized at this time, so that no coin other than a dime will be accepted.

When a normal returned bottle has been inserted into the bottle receiving space of the detector and door 2 is closed, switch 30 is closed while switches 28 and 29 are raised to their upper switch positions. Now rejector solenoid 58 is energized, so that pennies will be accepted, while all of the other rejector solenoids are de-energized. Upon acceptance of a penny, switch 66 closes momentarily and completes a circuit that energizes rejector solenoids 59 and 61. After switch 66 reopens, solenoids 59 and 61 are kept energized by a holding contact 79 that is closed by operation of solenoid 59. Now the coin mechanism will receive a nickel or a quarter, and upon the receipt of either of these coins relay 71 is energized to initiate a vending operation. Consequently, the machine will dispense a bottle of beverage at a sale price of 6 cents with a returned bottle.

If a broken bottle is inserted into the detector and door 2 is closed, switch 29 is raised to its upper position while switches 28 and 30 drop to their lower positions. With the detector switches in these positions, none of the coin rejector solenoids is energized, and consequently, the machine cannot be operated with a broken bottle in the bottle receiving space of the detector. Whenever door 2 is open, or whenever an oversized bottle has been inserted into the detector, switch 30 is open and the machine cannot be operated. Whenever an undersized bottle has been inserted, the machine either will not operate at all, as in the case of a broken bottle, or will operate only upon the insertion of a dime so that the insertion of undersized bottles is of no advantage to the customer.

Those skilled in the art will appreciate that the electrical circuits may be modified and rearranged in other ways to provide various sale prices. If desired, the circuit may be so arranged that none of the rejector solenoids is energized unless a normal returned bottle has been received, in which case a returned bottle must be inserted before each vending operation, and the option of making a purchase at a higher price without a returned bottle is eliminated.

Furthermore, if so desired, the machine may be modified by eliminating the provisions for delivering full bottles, so that the machine is used simply as a bottle receiving machine. In this case, the coin receiving mechanism may also be omitted, and the circuit is so arranged that operation of motor 70 is initiated whenever the bottle detector switches are in positions corresponding to the presence of a normal returned bottle in the bottle receiving space, with door 2 closed. In such a machine, a pay-out mechanism operates simultaneously with the operation of motor 70 to return to the customer coins or tokens equal in value to a deposit on the bottle added to the sale price of bottled beverages sold by other means.

It should be understood that this invention in its broader aspects is not limited to specific embodiments herein illustrated and described, and that the following claims are intended to cover all changes and modifications that do not depart from the true spirit and scope of the invention.

What is claimed is:

1. Returned bottle receiving and detecting apparatus, comprising a cabinet having a door that can be opened for the insertion neck-first endwise of a returned bottle, a radially finned drum for engaging a neck portion of said bottle, a slanting member, spring means for resiliently urging said slanting member downward against a butt portion of said bottle with sufficient force to move the bottle inward until said neck portion abuts against said drum, the downward motion of said slanting member being stopped at an intermediate position by a normal returned bottle, an electrical switch operated by movement of said slanting member downward beyond said intermediate position, an electrical switch operated by movement of said slanting member upward from said intermediate position, and means automatically raising said slanting member when said door is opened.

2. A returned bottle detector, comprising two substantially horizontal levers side-by-side each mounted for rotation about a horizontal axis, a slanting part depending from a first one of said levers for engaging a butt portion of a returned bottle, a part depending from a second one of said levers for engaging a waist portion of said bottle, said levers being held in intermediate positions by engagement of said depending parts with a normal returned bottle, a first electrical switch operated by movement of said first lever downward beyond its aforesaid intermediate position, a second electrical switch operated by movement by said second lever downward beyond its aforesaid intermediate position, a third electrical switch operated by movement of said second lever upward from its aforesaid intermediate position, and circuit means controlled by the operation of said first, second and third switches jointly to provide an electric signal responsive to a normal returned bottle.

3. A returned bottle detector as in claim 2, in which a part of said first lever underlies a portion of said second lever so that said second lever is raised by upward movement of said first lever.

4. A returned bottle detector as in claim 2, in which a portion of said part depending from said second lever underlies a portion of said first lever.

5. Returned bottle receiving and detecting apparatus, comprising a cabinet having a door that can be opened for the insertion neck-first endwise of a returned bottle, a radially finned drum for engaging a neck portion of said bottle, first and second substantially horizontal side-by-side levers, said first lever being rigidly attached to a horizontal rotative shaft, said second lever being pivoted for rotation independent of said shaft, a slanting part depending from said first lever for engaging a butt portion of said bottle, said slanting part underlying a portion of said second lever, spring means attached to said shaft for urging said slanting part downward against said butt portion, a part depending from said second lever for engaging a waist portion of said bottle, a portion of said part depending from said second lever underlying a portion of said first lever, means for automatically raising said levers when said door is opened, and a plurality of electrical switches operated by movement of said levers.

6. Returned bottle receiving and detecting apparatus, comprising a cabinet having a door that can be opened for the insertion neck-first endwise of a returned bottle, a radially finned drum for engaging a neck portion of said bottle, first and second substantially horizontal side-by-side levers, said first lever being rigidly attached to a horizontal rotative shaft, said second lever being pivoted for rotation independently of said shaft, a slanting part depending from said first lever for engaging a butt portion of said bottle, said slanting part underlying a portion of said second lever, spring means attached to said shaft for resiliently urging said slanting part downward against said butt portion, a part depending from said second lever for engaging a waist portion of said bottle, a portion of said part depending from said second lever underlying a portion of said first lever, said levers being held in intermediate positions by engagement of said depending parts with said bottle, a first electrical switch operated by movement of said first lever downward beyond its aforesaid intermediate position, a second electrical switch operated by movement of said second lever downward beyond its aforesaid intermediate position, a third electrical switch operated by movement of said second lever upward from its aforesaid intermediate position, and means attached to said door for automatically lifting said second lever and thereby operating said third switch when said door is opened, said part depending from said second lever raising said first lever after said third switch is operated.

7. Returned bottle receiving and detecting apparatus, comprising a cabinet having a door that can be opened for the insertion neck-first endwise of a returned bottle, a radially finned drum for engaging a neck portion of said bottle, first, second and third substantially horizontal side-by-side levers, said first lever being rigidly attached to a horizontal rotative shaft, said second and third levers being pivoted for rotation independently of said shaft, a slanting part depending from said first lever for engaging a butt portion of said bottle, said slanting part underlying a portion of said second lever, spring means attached to said shaft for urging said slanted part downward against said butt portion, a part depending from said second lever for engaging a waist portion of said bottle, a portion of said part depending from said second lever underlying a portion of said first lever, a part attached to said third lever overlying said first and second levers, means for automatically raising said levers when said door is opened, and a plurality of electrical switches operated by movement of said levers.

8. Returned bottle receiving and detecting apparatus, comprising a cabinet having a door that can be opened by the insertion neck-first endwise of a returned bottle, a radially finned drum for engaging a neck portion of said bottle, first, second and third substantially horizontal side-by-side levers, said first lever being rigidly attached to a horizontal rotative shaft, said second and third levers being pivoted for rotation independent of said shaft, a slanting part depending from said first lever for engaging a butt portion of said bottle, said slanting part underlying a portion of said second lever, spring means attached to said shaft for resiliently urging said slanting part downward against said butt portion, a part depending from said second lever for engaging a waist portion of said bottle, a portion of said part depending from said second lever underlying a portion of said first lever, a part attached to said third lever overlying said first and second levers, said first and second levers being held in intermediate positions by engagement of said depending parts with a normal returned bottle, a first electrical switch operated by movement by said first lever downward beyond its aforesaid intermediate position, a second electrical switch operated by movement of said second lever downward beyond its aforesaid intermediate position, a third electrical switch operated by upward movement by said third lever, and means for automatically raising said three levers when said door is opened.

9. A returned bottle detector comprising two substantially horizontal levers side-by-side each mounted for rotation about a horizontal axis, a slanting part depending from a first one of said levers for engaging an end portion of a returned bottle, means for biasing said first lever into contact with said bottle with sufficient force to bias said bottle longitudinally, a part depending from a second one of said levers for engaging a second portion of said bottle, said levers being held in intermediate positions by engagement of said depending parts with a normal returned bottle, electrical switching means operated by movement of said levers, said switching means including a first switch contact that is opened by movement of said first lever downward beyond its aforesaid intermediate position, a second switch contact that is closed and a third switch contact that is opened by movement of said second lever downward beyond its aforesaid intermediate position, and a fourth switch contact that is opened by movement of said second lever upward from its aforesaid intermediate position, first coin rejecting mechanism, circuit means connecting said second and fourth switch contacts in series with said first coin rejecting mechanism, second coin rejecting mechanism, and circuit means connecting said first, third and fourth switch contacts in series with said second coin rejecting mechanism.

10. A returned bottle detector, comprising two substantially horizontal levers side-by-side each mounted for rotation about a horizontal axis, a slanting part depending from a first one of said levers for engaging a butt portion of a returned bottle, a stop, means for biasing said first lever into contact with said bottle with sufficient force to move said bottle longitudinally into biased contact with said stop, a part depending from the second one of said levers for engaging a waist portion of said bottle, said levers being held in intermediate positions by engagement of said depending parts with a normal returned bottle, electrical switching means operated by movement of said levers, said switching means including a first switch contact that is opened by movement of said first lever downward beyond its aforesaid intermediate position, a second switch contact that is closed and a third switch contact that is opened by movement of said second lever downward beyond its aforesaid intermediate position, and a fourth switch contact that is opened by movement of said second lever upward from its aforesaid intermediate position, a first coin rejecting mechanism, circuit means connecting said second and fourth switch contacts in series with said first coin rejecting mechanism, a second coin rejecting mechanism, and circuit means connecting said first, third, and fourth switch contacts in series with said second coin rejecting mechanism.

11. In a returned bottle detector, the combination of means for receiving a returned bottle having a neck end and a butt end, means for establishing said neck end in a fixed position, a gauging member slanted relative to said bottle, and means for moving said gauging member into slanting contact with a rim portion of said butt end, whereby the bottle-contacting position of said gauging member gauges said bottle for an acceptable combination of length and butt-end diameter.

12. Returned bottle receiving and detecting apparatus, comprising a cabinet having an opening for the insertion of a returned bottle having a neck end and a butt end, a neck-engaging member for engaging a portion of said neck-end, a movable butt-engaging member slanted relative to the returned bottle for engaging a rim portion of said butt end, spring means for resiliently urging said butt-engaging member inward against said rim portion with sufficient force to drive the returned bottle into engagement with said neck-engaging member, and means operated by the movement of said butt-engaging member for gauging the size of the returned bottle for an acceptable combination of length and butt-end diameter.

13. Returned bottle receiving and detecting apparatus, comprising a cabinet having a receiving space for receiving a returned bottle and a storage space for storing bottles, a plurality of movable gauging members within said receiving space, means for biasing each of said gauging members for movement into contact with the returned bottle, such movement being limited by a normal returned bottle so that each of said gauging members assumes a first position when a normal returned bottle is in said receiving space and assumes a second position when no bottle is in said receiving space, conveyor means for moving a returned bottle from said receiving space to said storage space, and means permitting operation of said conveyor means whenever all of said gauging members are in the same one of said first and second positions and preventing the operation of said conveyor means whenever respective ones of said gauging members are in different ones of said first and second positions.

14. A returned bottle detector, comprising two substantially horizontal levers side-by-side each mounted for rotation about a horizontal axis, a slanting part depending from a first one of said levers for engaging a butt portion of a returned bottle, a part depending from a second one of said levers for engaging a waist portion of said bottle, said levers being held in intermediate positions by engagement of said depending parts with a normal returned bottle, and electrical switching means operated by movement of said levers, said switching means including a first switch contact that is opened by movement of said first lever downward beyond its aforesaid intermediate position, a second switch contact that is closed and a third switch contact that is opened by the movement of said second lever downward beyond its aforesaid intermediate position, and a fourth switch contact that is opened by movement of said second lever upward from its aforesaid intermediate position, circuit means interconnecting said first, third and fourth contacts to provide a closed electrical circuit responsive to a normal returned bottle, and circuit means interconnecting said second and fourth contacts to provide another closed electrical circuit in the absence of any returned bottle, neither of said circuits being closed with said first lever downward beyond said intermediate position while said second lever is in said intermediate position.

15. A returned bottle detector comprising first and second gauging members, said first gauging member having a slanting portion for contact with the butt portion of a returned bottle, and said second gauging member having a portion for contact with the neck portion of said returned bottle, one of said gauging members being movable relative to the other said gauging member, and means for biasing said movable member into contact with said returned bottle with sufficient force to move said returned bottle into biased contact with the other said gauging member, whereby the returned bottle is gauged for an acceptable combination of length and butt-end diameter.

References Cited in the file of this patent

UNITED STATES PATENTS

| | | |
|---|---|---|
| 992,926 | Updegraff | May 23, 1911 |
| 1,560,242 | Jones et al. | Nov. 3, 1925 |
| 1,996,668 | Bliss | Apr. 2, 1935 |
| 2,293,586 | Bardet et al. | Aug. 18, 1942 |
| 2,804,958 | Garrard | Sept. 3, 1957 |